United States Patent
Jain

(10) Patent No.: US 8,405,729 B2
(45) Date of Patent: Mar. 26, 2013

(54) SYSTEM AND METHOD FOR PAIRING HAND-HELD DEVICES UTILIZING A FRONT-FACING CAMERA

(75) Inventor: Ankur Jain, Redwood City, CA (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 29 days.

(21) Appl. No.: 13/105,088

(22) Filed: May 11, 2011

(65) Prior Publication Data

US 2012/0287290 A1    Nov. 15, 2012

(51) Int. Cl.
*H04N 5/225* (2006.01)
*H04N 5/222* (2006.01)

(52) U.S. Cl. ............................. 348/207.1; 348/333.01

(58) Field of Classification Search ............ 348/207.99, 348/207.1, 211.99, 211.1, 222.1, 211.2, 333.01, 348/333.02, 333.05, 333.11
See application file for complete search history.

(56) References Cited

U.S. PATENT DOCUMENTS

| | | | | |
|---|---|---|---|---|
| 7,912,426 | B2* | 3/2011 | Masera et al. | 455/41.2 |
| 8,024,576 | B2* | 9/2011 | Gargaro et al. | 713/183 |
| 8,116,685 | B2* | 2/2012 | Bregman-Amitai et al. | 455/41.2 |
| 2006/0028557 | A1* | 2/2006 | Watanabe | 348/211.99 |
| 2006/0135064 | A1* | 6/2006 | Cho et al. | 455/41.1 |
| 2008/0081666 | A1* | 4/2008 | Masera et al. | 455/557 |
| 2010/0012715 | A1* | 1/2010 | Williams et al. | 235/375 |
| 2010/0163613 | A1* | 7/2010 | Bucher et al. | 235/375 |
| 2010/0312382 | A1* | 12/2010 | Ma et al. | 700/236 |
| 2011/0081860 | A1* | 4/2011 | Brown et al. | 455/41.3 |
| 2011/0101086 | A1* | 5/2011 | Yach | 235/375 |
| 2011/0111840 | A1* | 5/2011 | Gagner et al. | 463/25 |
| 2011/0183612 | A1* | 7/2011 | Bregman-Amitai et al. | 455/41.2 |
| 2011/0275358 | A1* | 11/2011 | Faenger | 455/420 |
| 2011/0295502 | A1* | 12/2011 | Faenger | 701/211 |

FOREIGN PATENT DOCUMENTS

| | | |
|---|---|---|
| EP | 1551140 A1 | 7/2005 |
| EP | 2306692 A1 | 4/2011 |

OTHER PUBLICATIONS

European Search Report completed Aug. 13, 2012 in re EP Application No. 12003709.

* cited by examiner

*Primary Examiner* — Nicholas Giles
(74) *Attorney, Agent, or Firm* — Coats & Bennett, P.L.L.C.

(57) ABSTRACT

A hand-held wireless communications device includes a camera integrated within a housing of the wireless communications device, a front-facing lens assembly to focus light onto the camera, a display, and a controller connected to the camera and the display. The controller controls the camera to capture an image of another device that is in front of its display. The device can then analyze the image to extract information specific to the other device, and utilize that information to identify and authenticate the other device. Once identified and authenticated, the devices are able to share data and information with each other.

22 Claims, 7 Drawing Sheets

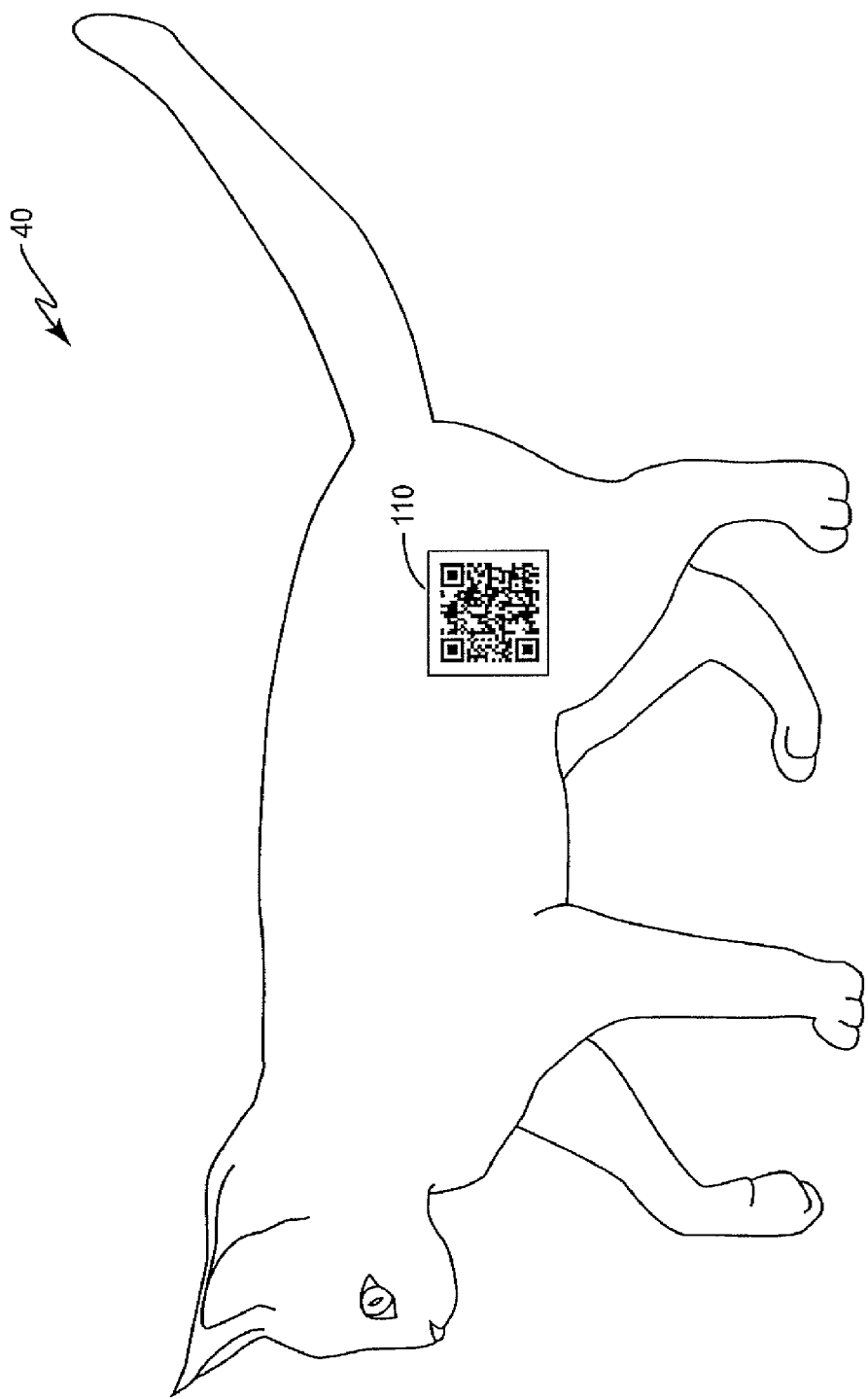

SYSTEM AND METHOD FOR PAIRING HAND-HELD DEVICES UTILIZING A FRONT-FACING CAMERA

FIELD OF THE INVENTION

The present invention relates generally to wireless communication devices, and more particularly to handheld wireless communication devices equipped with a camera and a front-facing lens assembly.

BACKGROUND

Handheld wireless communication devices are very common. They include devices such as cellular telephones, laptop and notebook computers, Personal Digital Assistants (PDAs), satellite communication devices, and tablet computers such as the iPAD, for example. These devices are very useful and convenient, and provide their users with a variety of functionality. For example, many devices are equipped with camera circuitry to allow the users to capture images and/or video. Many devices are also equipped with both long and short-range transceiver circuitry to allow a user to communicate data and information with remote devices over long and short distances in a variety of situations. Generally, two devices must be "paired" to communicate data with each other.

Conventional mechanisms and processes for pairing two devices can be cumbersome. Particularly, bidirectional messaging is usually required between devices (and possibly a server) to authenticate two devices, especially where security is an issue. This takes time and resources. Further, conventional pairing methods are not always able to accurately validate or authenticate another device because of the variables they rely upon for the authentication process. For example, BUMP technology allows two devices to share selected data with each other simply by "bumping" their devices together. Once two devices are "bumped," they each send their selected data to a network server. To ensure that only the intended devices receive each others' data, BUMP utilizes a matching algorithm located on the network server to pair the device. Specifically, the matching algorithm compares the geographical locations of the BUMPing parties, as well as the time of contact, and sends the selected content to each of the intended devices based on the outcome of that comparison. If for some reason the algorithm cannot determine whether two devices should be paired, the server simply sends a request to each device to have the users perform another BUMP.

BUMP technology is useful, but limited. For example, security is an issue given its method of pairing. Further, BUMP does not work well for pairing more than two devices at a time. This is because of the difficulty the matching algorithm has in identifying different devices when many devices are co-located in the same area. Perhaps most limiting, however, is that because BUMP is a time-position oriented application, it operates based on whether the devices are co-located when the bumping contact occurs. BUMP is not concerned with, and cannot operate based on, the context of an application executing on the device being BUMPed.

SUMMARY

The present invention provides a system and method for "pairing" two or more handheld camera-equipped communication devices. The pairing process of the present invention will allow two or more camera-equipped devices to establish a communications link and authenticate or validate their identities to each other. Further, the devices are paired automatically without user interaction based on the context of an application that is executing on each device (i.e., what is displayed on a display screen) rather than on mere presence of the device, as is conventional. Once paired, each device can share data and information with the other devices, as well as generate commands to control the functionality of the other devices.

Accordingly, embodiments of the present invention comprise methods of pairing a first camera-equipped wireless communications device with a second camera-equipped wireless communications device, wherein each device faces the other and has a front-facing camera lens. One exemplary method comprises capturing, at the first wireless communications device, an image of a graphical indicator displayed on a display of the second wireless communications device, analyzing the graphical indicator in the captured image, and pairing the first and second wireless communications devices for communications based on the analysis.

In one embodiment, capturing the image of the graphical indicator displayed at the second wireless communications device comprises controlling a camera at the first wireless communications device to capture an image of a display screen of the second wireless communications device at predetermined time intervals, and increasing the time interval length if the captured image does not contain the graphical indicator.

In one embodiment, the method further comprises determining whether the graphical indicator is included in the captured image.

In one embodiment, if the graphical indicator is in the captured image, the method further comprises comparing information associated with the graphical indicator in the captured image to corresponding information stored in a memory, and identifying and authenticating the second wireless communications device based on the results of the comparison.

In one embodiment, the graphical indicator in the captured image comprises a graphical icon associated with the second wireless communication device.

In one embodiment, the information associated with the graphical indicator comprises data encoded into the graphical indicator.

In one embodiment, the method further comprises determining a predefined type of interaction to occur between the first and second wireless communications devices based on the analysis.

In one embodiment, the predefined type of interaction comprises sharing data between the first and second wireless communications devices.

In another embodiment, the predefined type of interaction comprises transferring one or more components of a game application from one of the first and second wireless communication devices to the other of the first and second communication devices.

In another embodiment, the predefined type of interaction comprises communicating commands from one of the first and second wireless communication devices to control one or more functions at the other of the first and second communication devices.

In one embodiment, the method further comprises generating, at the first wireless communications device, a local graphical indicator to appear on a display of the first wireless communications device.

In one embodiment, the method further comprises generating the local graphical indicator based on data that can be used to identify and authenticate the first wireless communication device to the second wireless communication device.

In one embodiment, pairing the first and second wireless communications devices based on the analysis comprises pairing the first and second wireless communications devices based on the content of an application executing on one or both of the first and second wireless communications devices.

In addition, the present invention also provides a hand-held wireless communications-device. In one exemplary embodiment, the device comprises a camera integrated within a housing of the wireless communications device, a front-facing lens assembly to focus light onto the camera, a display, and a controller connected to the camera and the display. In one embodiment, the controller is configured to control the camera to capture an image of a graphical indicator displayed on a display of a remote wireless communications device, analyze the captured image of the graphical indicator displayed by the remote device, and pair the wireless communications device and the remote device for communications based on the analysis.

In one embodiment, the controller is further configured to control the camera to capture the image of the graphical indicator displayed on the display of the remote device at predetermined time intervals, and increase the time interval length if the captured image does not contain the graphical indicator.

In one embodiment, the controller is further configured to determine whether the graphical indicator displayed on the display of the remote device is included in the captured image.

In one embodiment, if the graphical indicator is included in the captured image, the controller is further configured to compare information associated with the graphical indicator in the captured image to corresponding information stored in a memory, and identify and authenticate the remote device based on the results of the comparison.

In one embodiment, the graphical indicator in the captured image comprises an avatar associated with a game application being executed by the remote device.

In one embodiment, the information associated with the graphical indicator comprises encoded data.

In one embodiment, the controller is further configured to determine a predefined type of interaction to occur between the wireless communications device and the remote device based on the analysis.

In one embodiment, the predefined type of interaction comprises sharing data between the devices.

In one embodiment, the predefined type of interaction comprises transferring one or more components of a game application from one of the devices to the other of the devices.

In one embodiment, the predefined type of interaction comprises communicating commands from one of the devices to control one or more functions at the other of the devices.

In one embodiment, the controller is further configured to generate a local graphical indicator to appear on a display of the wireless communications device.

In one embodiment, the controller is further configured to generate the local graphical indicator based on data that can be used to identify and authenticate the wireless communication device to the remote device.

In one embodiment, the controller is further configured to pair the devices based on the content of an application executing on one or both of the devices.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 5A is a perspective view illustrating a graphical indicator displayed by a handheld device according to one embodiment of the present invention.

DETAILED DESCRIPTION

The present invention provides a system and method for "pairing" two or more handheld camera-equipped communication devices based on the context of an application executing on one or both of the devices. Particularly, each device involved in the pairing process is equipped with camera circuitry and a "front-facing" lens assembly. As used herein, the term "front-facing" means that the camera's lens assembly is situated in or on the housing of a device such that the lens assembly faces in substantially the same direction as the face of a display on the device. In other words, the lens assembly is oriented on the device such that camera-circuitry integrated within the device can capture an image of an object that is in front of the device's display screen.

In one embodiment, the devices operate to establish a communications link and authenticate their identities to each other based on the context of an application that is executing on each device. Particularly, each device is configured to detect a predetermined event associated with the executing application. Upon detecting the event, the devices are positioned so that their respective "front faces" (i.e., their respective display screens and lens assemblies) face each other. Each device then captures an image of a graphical indicator displayed on the other device and analyzes that image to identify and authenticate the other device. Once identified and authenticated, each device can utilize the information obtained from the analysis to pair with the other device. Once paired, each device can share data and information with the other device, or generate commands to temporarily control the functions of the other device.

Figure 1:
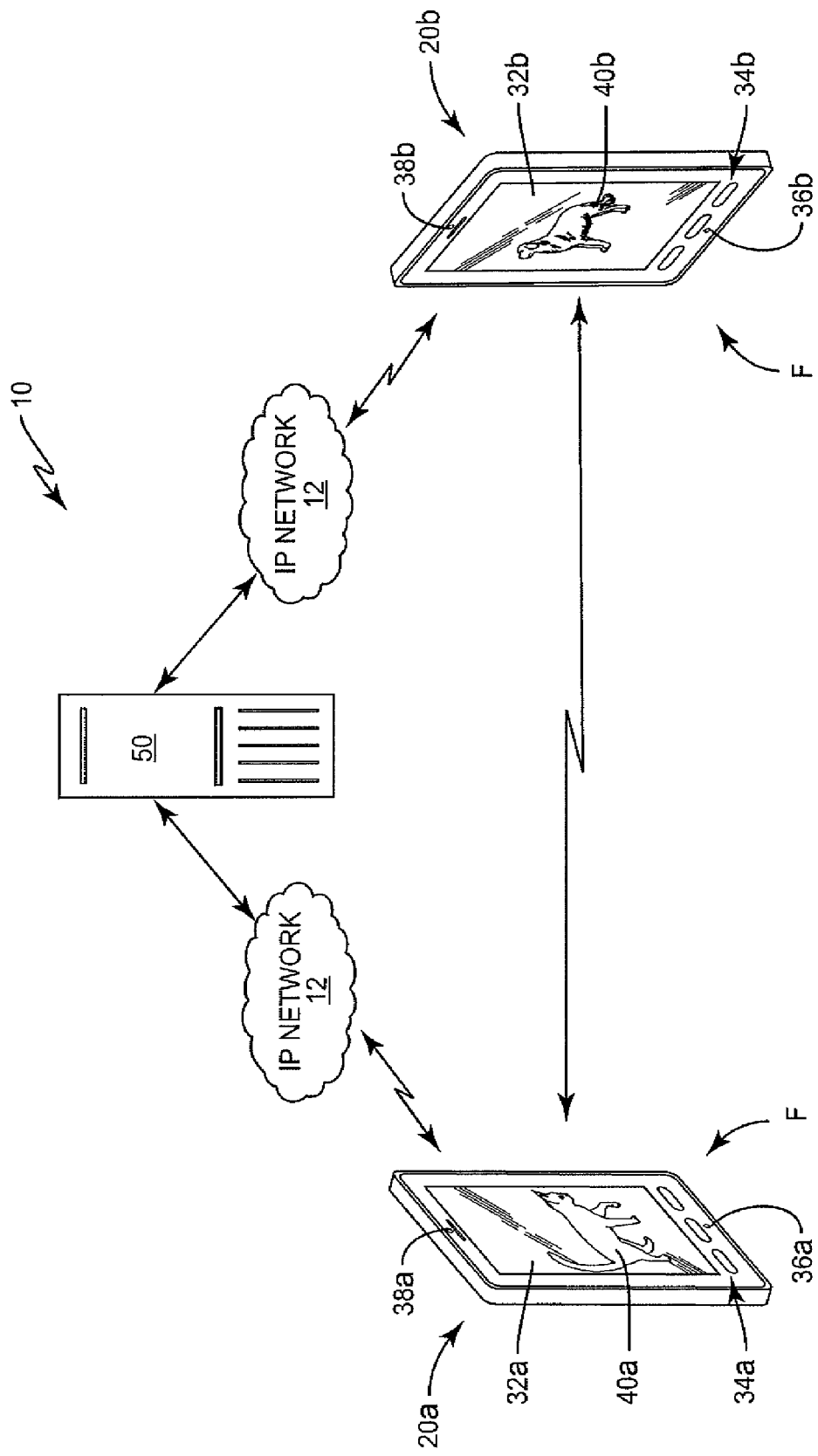
FIG. 1 is a perspective view illustrating how two handheld devices might function to authenticate each other based on the context of an application executing on the devices according to one or more embodiments of the present invention.

Turning now to the drawings, FIG. 1 is a perspective view of a system 10 configured according to one embodiment of the present invention. System 10 comprises a pair of handheld, camera-equipped, portable communication devices 20a, 20b (collectively referred to herein as "devices 20") communicatively connected to a network server 50 via one or more IP networks 12. Each device 20a, 20b is equipped with camera circuitry (FIG. 2) and a lens assembly 38a, 38b that enables the devices to capture images of objects positioned in front F of them. Such objects include, according to one embodiment of the present invention, unique graphical indicators 40*a*, 40*b*, or other device identifiers, displayed on the display screen 32*a*, 32*b* of another device.

More particularly, each device 20*a*, 20*b* executes an application program, such as a game application, for example, that may periodically generate predetermined events. In response to detecting these events, one or both of the devices 20*a*, 20*b* display the unique graphical indicator 40*a*, 40*b*, on their respective displays 32*a*, 32*b*. Upon detecting the event, the devices 20*a*, 20*b* get positioned within close proximity to one another by their users such that they face each other. Each device 20*a*, 20*b* then captures an image of the indicator 40*a*, 40*b* displayed by the other device 20*a*, 20*b*, and independently analyzes its captured image to determine the identity of, and to authenticate, the other device.

In some embodiments, the devices 20*a*, 20*b* themselves include the data and/or the logic needed to identify and authenticate the other device. In other embodiments, which are seen later, a network server 50 contains the data and/or logic needed to identify and authenticate the devices 20*a*, 20*b*. Regardless of the location of the data and logic, however, the present invention causes each device 20 to capture an image of a graphical indicator 40 displayed by the other device 20, and then analyzes those images so that each device 20 can identify and authenticate the other device 20. So identified, each device 20 can be paired with the other device 20, and perform any of a variety of different functions, such as share data and information with the other device 20, receive data and/or code for execution from the other device 20, and communicate commands that are used to remotely control the functions of the other device 20.

As seen in FIG. 1, the devices 20 are depicted as cellular telephones, and more particularly, as smartphones; however, this is for illustrative purposes only. The present invention may be embodied in any type of portable communication device capable of capturing images of objects positioned in the front of the device. Some exemplary devices include, but are not limited to, satellite phones, Personal Digital Assistants (PDAs), and tablet computing devices.

Figure 2:
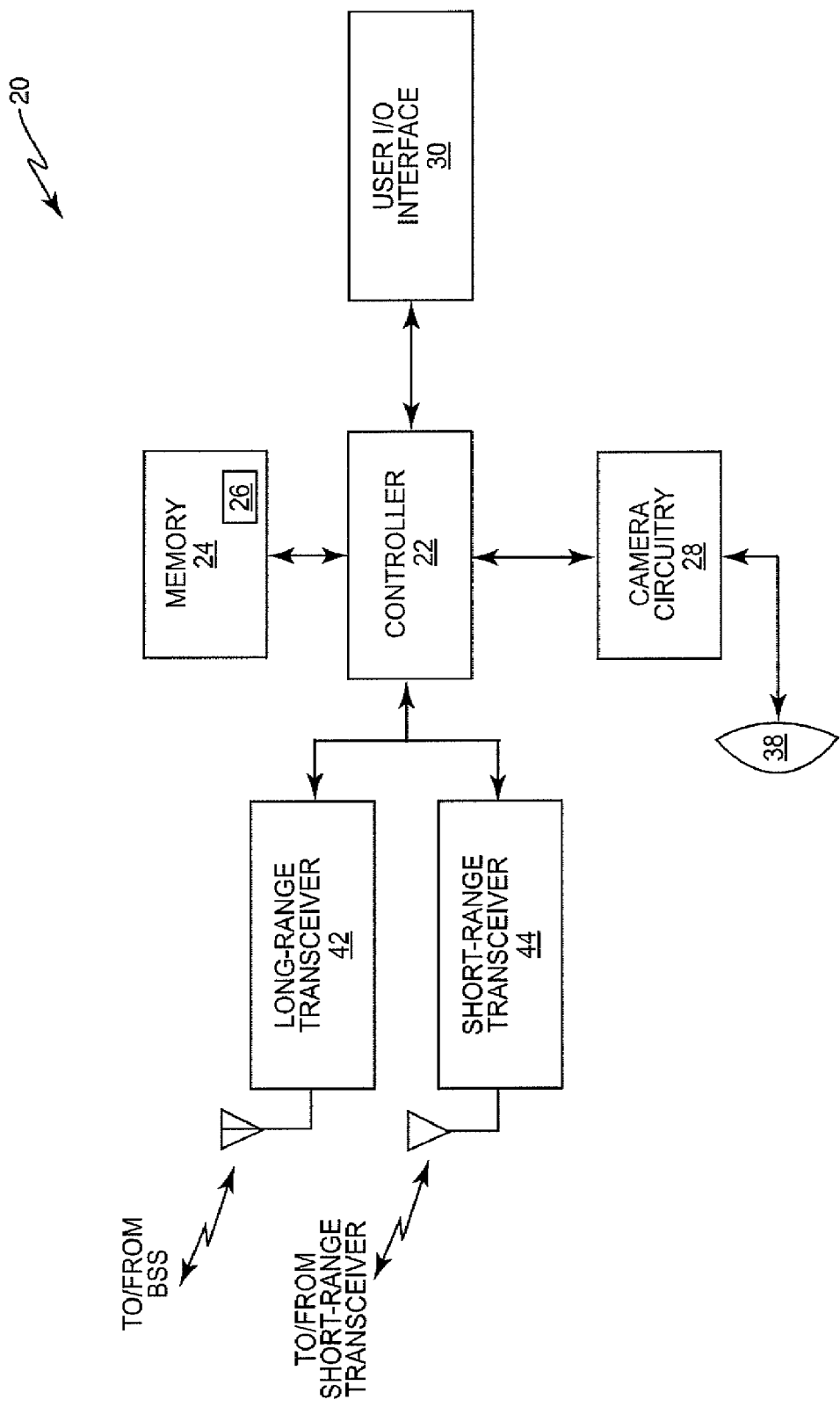
FIG. 2 is a block diagram illustrating some of the component parts of a camera-equipped handheld wireless communications device configured to operate according to one embodiment of the present invention.

FIG. 2 is a block diagram illustrating some of the components of a device 20 configured according to one embodiment of the present invention. As seen in FIG. 2, device 20 comprises a programmable controller 22, memory 24, camera circuitry 28 operatively connected to a lens assembly 38, a user interface 30, and one or more communication interfaces, such as long-range and short-range transceivers 42, 44, respectively. In one embodiment, one or more application programs 26 that execute on device 20 may be stored in memory 24.

Controller 22 may be, for example, one or more general purpose or special purpose microprocessors that control the operation and functions of device 20 in accordance with program instructions and data stored in memory 24. In one embodiment of the present invention, controller 22 is configured to execute application 26 for the user and to detect a predetermined event generated by the application 26. The application 26 may be, for example, a game application that the user plays on device 20. Upon detecting the event, the controller 22 generates the appropriate control signals to cause the camera circuitry 28 to begin capturing images of an object that is in front of the device 20.

As described in more detail later, controller 22 may first perform a preliminary analysis on a captured image to determine whether the image contains a graphical indicator 40. If so, controller 22 will either process the image further to identify and authenticate the other device, or send the image data in an identification/authentication request message to server 50 so that server 50 can perform the analysis. If the preliminary analysis reveals that the captured image does not contain the graphical indicator 40, controller 22 is programmed to throttle the periodicity of the image capturing process so as to conserve its battery resources.

Memory 24 represents the entire hierarchy of memory in device 20, and may include both random access memory (RAM) and read-only memory (ROM). Memory 24 stores the program instructions and data required for controlling the operation and functionality of device 20, as well as the application program 26. As previously stated, memory 24 may also store the application code and/or data needed to perform the identification/authentication services of the present invention.

Camera circuitry 28 is a conventional camera integrated into the interior of the device 20. Since the use and structure of camera 28 is well-known in the art, it is only briefly described here.

Camera 28 is operatively connected to a front-facing lens assembly 38. Although not specifically shown in the figures, those skilled in the art will appreciate that the camera 28 comprises an image sensor, an image processor (which may be part of, or independent of controller 22), and a memory. In operation, the lens assembly 38 focuses light entering the device 20 onto the image sensor. Using a process well-known in the art, the sensor then sends values representing the light to the image processor for processing. In the present invention, the values received at the image processor represent the graphical indicator 40 displayed on the display screen of another device. The image processor then analyzes the values using one or more well-known techniques and passes the results to the controller 22. Upon receiving those results, controller 22 may utilize the results to identify and/or authenticate the device that displayed the indicator, as well as to pair with the device that displayed the indicator.

The User Input/Output (I/O) Interface 30 enables the user to exchange information with device 20 and includes controls that facilitate such interaction. As was seen in FIG. 1, the user interface 30 includes a display 32, one or more controls or keys 34, a microphone 36, and one or more loudspeakers. Other components not specifically shown may also be present in the user I/O interface.

Each of the components 32, 34, 36, of the user I/O interface 30 operates conventionally, and thus, no particular detailed explanation of their functions is needed here. It is sufficient to note that display 32 allows the user to conventionally view information such as dialed digits, images, call status, menu options, and other service information, as well as enter digits and other alpha-numeric input. In addition, however, display 32, which may be a Liquid Crystal Display (LCD) or touch-sensitive display, for example, is configured to display the graphical indicator 40 responsive to controller 22 detecting some predetermined event associated with an application executing on device 20.

The communications interfaces 42, 44 may be any communication interfaces known in the art. In this embodiment, however, communication interfaces comprise a fully functioning cellular transceiver 42 capable of communicating data and information to one or more remote devices via one or more base stations (not shown) and network 12. Similarly, communications interface comprises a short-range transceiver 44 that permits the user to communicate data and information with a corresponding short-range transceiver over relatively short distances—usually tens of meters. Those skilled in the art will appreciate that the one or both of the transceivers 42, 44 may implement any one of a variety of communication standards including, but not limited to, the standards known as the Global System for Mobile Communications (GSM), General Packet Radio Service (GPRS), Universal Mobile Telecommunication System (UMTS), TIA/EIA-136, cdmaOne (IS-95B), cdma2000, 3GPP Long Term Evolution (LTE), and Wideband CDMA (W-CDMA), and IEEE 802.xx.

Figure 3:
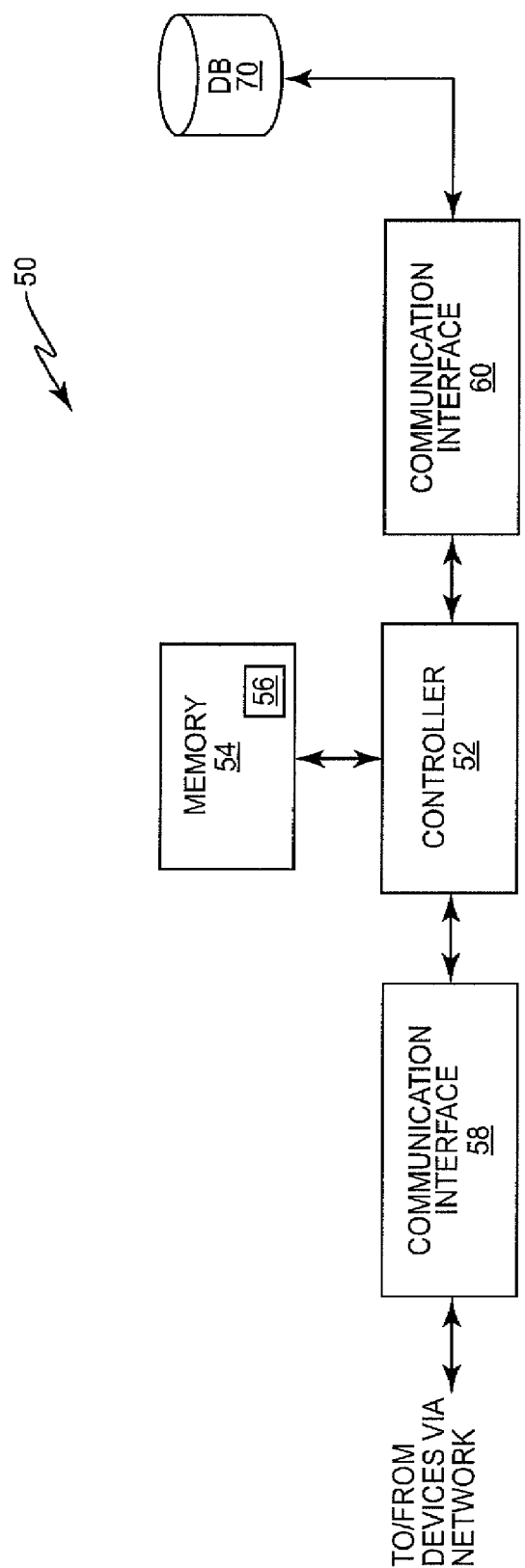
FIG. 3 is a block diagram illustrating some of the component parts of a network server configured to operate according to one embodiment of the present invention.

FIG. 3 is a block diagram illustrating some of the component parts of server 50 configured to operate according to one embodiment of the present invention. Server 50 may comprise any network-based computing device known in the art that communicates with each device 20 using known protocols and messaging mechanisms. As seen in FIG. 3, server 50 comprises a controller 52, memory 54, and a pair of communication interfaces 58, 60.

As previously stated, server 50 may, in some embodiments, contain the application code and data required to perform the identification/authentication services required to identify and authenticate a device 20. Particularly, when the devices 20 capture images of the graphical indicators displayed by the other device 20, the results of an analysis performed on those images may be communicated to server 50 via network 12. Upon receipt, server 50 could analyze those results in order to identify and authenticate a device, and then send a response message back to the requesting device. Alternatively, the server 50 could simply receive the images and perform the analysis for the devices 20, and then send a response to each device 20 identifying and/or authenticating the other device 20.

In more detail, the first communications interface 58 is configured to receive request messages from device 20 requesting identification and/or authentication services to identify another remote device 20. The request messages, as previously stated, may contain the captured image of a graphical indicator 40 displayed by the remote device 20, or may contain the data and information output from the analysis of such an image performed at the device 20. Upon receipt of a request message, controller 52 extracts and processes the data and information to identify and/or authenticate the remote device 20. For example, in one embodiment, the controller 52 at server 50 compares the received data against corresponding data in a table 56 stored in memory 54. In another embodiment, the controller 52 uses the received data to query a database 70 via a second communications interface 60. In either case, the controller 52 generates a response message based on the results of the query to include the identity and/or address of the remote device, and returns the response to the device 20 via the first communication interface 58.

Those skilled in the art will appreciate that the messaging between the device 20 and server 50 may be accomplished using any method or protocol known in the art. However, in one embodiment, the messages passed between the two entities are formatted and communicated according to the Hypertext Transfer Protocol (HTTP).

Figure 4A:
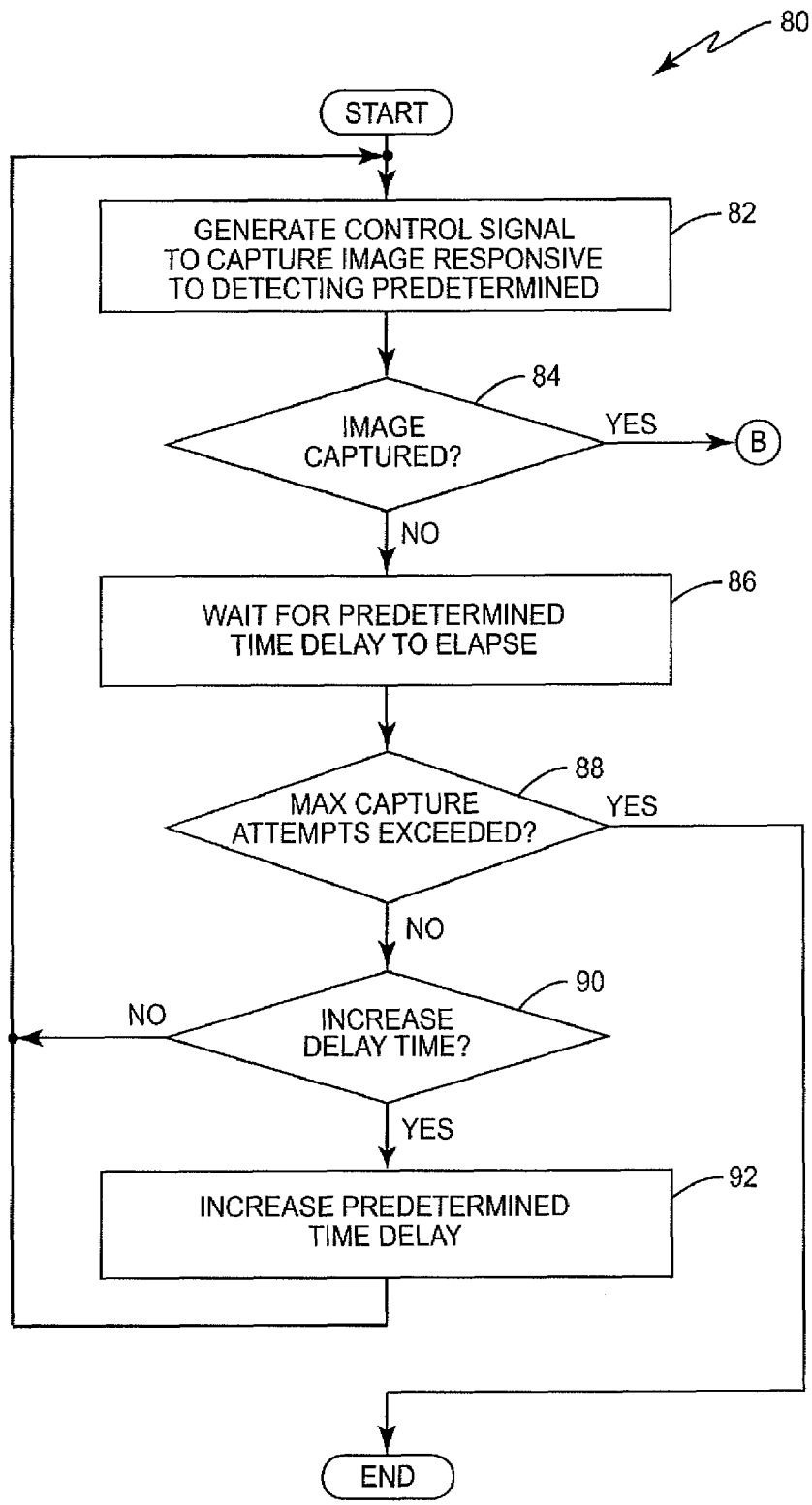
FIGS. 4A-4B are flow charts illustrating a method by which two devices autonomously authenticate each other based on the context of an application executing on one or both of the devices according to one or more embodiments of the present invention.
Figure 4B:
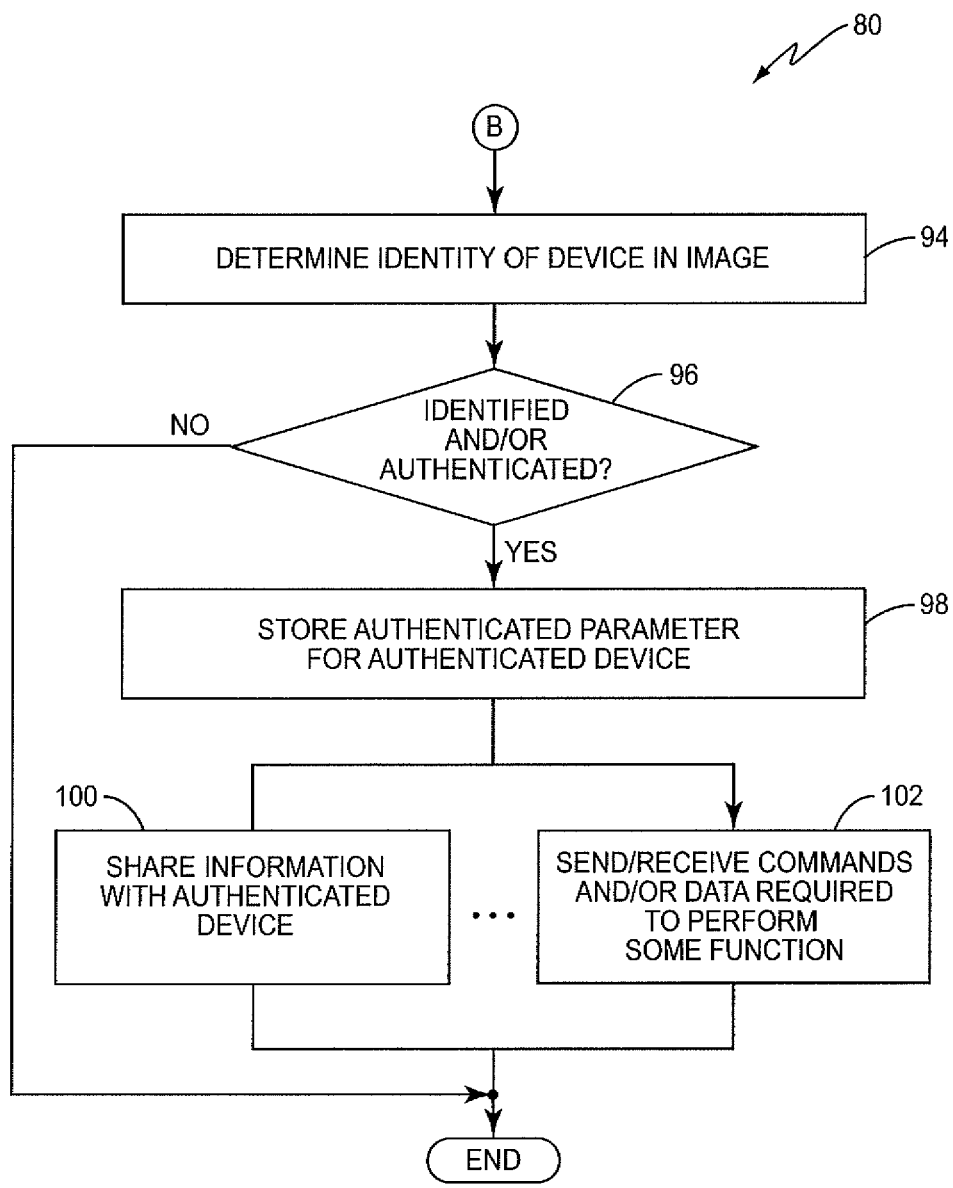

FIGS. 4A-4B are flow charts illustrating a method 80 of the present invention according to one embodiment. Method 80 assumes that both devices 20 are executing an application that requires both devices 20 to be proximate each other, and to interact with each other. For example, the application may be a multiplayer game application in which game play is at least partially based on whether the display screen 38 of each device 20a, 20b is "visible" to the other device 20a, 20b. That is, the devices 20 must be near enough to each other and oriented to face each other so that the camera circuitry 28 of each device 20 is able to capture images of the display 38 of the other device 20. With such applications, one device 20 may display a graphical icon, character, or avatar, for example, which can be captured as an image by the other device 20 and used to interact with the other device 20.

For clarity and ease of illustration, method 80 is described herein as it is performed by one of the devices 20. However, those skilled in the art will appreciate that method 80 may be performed by each device 20a, 20b independently and substantially simultaneously.

Method 80 begins when device 20a detects the occurrence of a predetermined event during game play. For example, the application 26 may generate the event whenever one or both of the users reach a predefined level. In response to detecting the event, controller 22 of device 20 is programmed to automatically generate a signal to activate the camera circuitry 28 to begin capturing images of whatever is in front of the device 20 (box 82).

According to one embodiment of the present invention, device 20 is configured to begin capturing images automatically and without requiring user intervention. Further, the camera 28 will continue automatically capturing images at predetermined, timed intervals (e.g., every 5 seconds) until device 20 has either successfully captured an image of the graphical indicator 40 displayed on the other device 20, or determined that the graphical indicator 40 in the captured image is not the expected indicator. However, such activity can quickly use up the limited power resources of device 20. Therefore, continuing to automatically capture image after image, absent some check or throttle, could unnecessarily drain the battery power. Therefore, in one embodiment, the controller 22 is programmed to throttle the periodicity of the image captures.

Specifically, controller 22 will generate a signal to cause camera 28 to capture an image at each timed interval. With each image capture, controller 22 may increment a count value v, and utilize known image processing techniques to perform a preliminary analysis on the image to determine whether the captured image includes a graphical indicator 40 (box 84). If the captured image does not include a graphical indicator 40 as expected, controller 22 waits for a predetermined delay time to elapse (e.g., 5 seconds) (box 86). Controller 22 will then compare the count value v it maintains against a predefined maximum threshold value to determine whether a maximum number of image capture attempts has been reached (box 88). If the comparison reveals that the maximum number of attempts has been reached or exceeded, controller 22 will cease generating signals to initiate further image capture attempts and method 80 ends. Otherwise, if the comparison reveals that the maximum number of attempts has not been reached or exceeded (box 88), controller 22 will determine whether it should increase the delay time between image capture attempts (box 90).

With this check, controller 22 can "throttle" the length of the predetermined time delay between image capture attempts. By way of example only, device 20 may be initially subject to a predetermined time delay of 3 seconds between image capture attempts. This initial time delay might remain the same for a first set of one or more image capture attempts (e.g., 3 attempts) (box 90). However, if device 20a has not captured an image after the first set of attempts the controller 22 might increase the delay time (box 92) by a predefined number of seconds (e.g., 1 second). The increased delay time would then remain the same for another set of one or more attempts before being increased again. This process of gradually increasing the delay time between unsuccessful attempts at capturing an image would continue until some predetermined event occurs, such as an indication that a max delay time has been reached, an image is captured, or until the maximum number of image capture attempts has been reached, for example.

Upon capturing an image of the front face F of the other device 20 (box 84), the controller 22 of device 20 then performs an analysis to determine the identity of the device 20, and in some cases, authenticate the device 20b (box 94, FIG. 4B). Any method known in the art may be used to identify and authenticate the device at controller 22. For example, in one embodiment, each device displays a graphical indicator 40 having a unique shape. The controller 22 performs an analysis on an image to determine the shape or outline of the graphical indicator 40. The controller 22 then compares that result to a known set of shapes stored in memory 24. Provided there is a match, the controller 22 can then identify the other device 20 by reading a unique device identifier (e.g., a phone number or some other unique ID) that is associated with the stored data.

In another embodiment, controller 22 can identify the device 20b by analyzing data that has been encoded into, and displayed with, the graphical indicator 40b. For example, indicator 40 may be generated to include a Quick Response (QR) code, such as the QR code 110 seen in FIGS. 5A-5B. QR codes are well-known in the art, and thus only a brief synopsis is provided here for clarity. However, for more information regarding this technology, the interested reader is directed to the standards document identified by reference number ISO/IEC 18004:2006, and entitled, "Information technology—Automatic identification and data capture techniques—QR Code 2005 bar code symbology specification," as well as to that standard's Technical Corrigendum 1 identified by reference number ISO/IEC 18004:2006/Cor.1:2009(E). Those two documents were published on Sep. 1, 2006, and Mar. 3, 2009, respectively, by the International Organization for Standardization (ISO), and are incorporated herein by reference in their entirety.

Figure 5B:
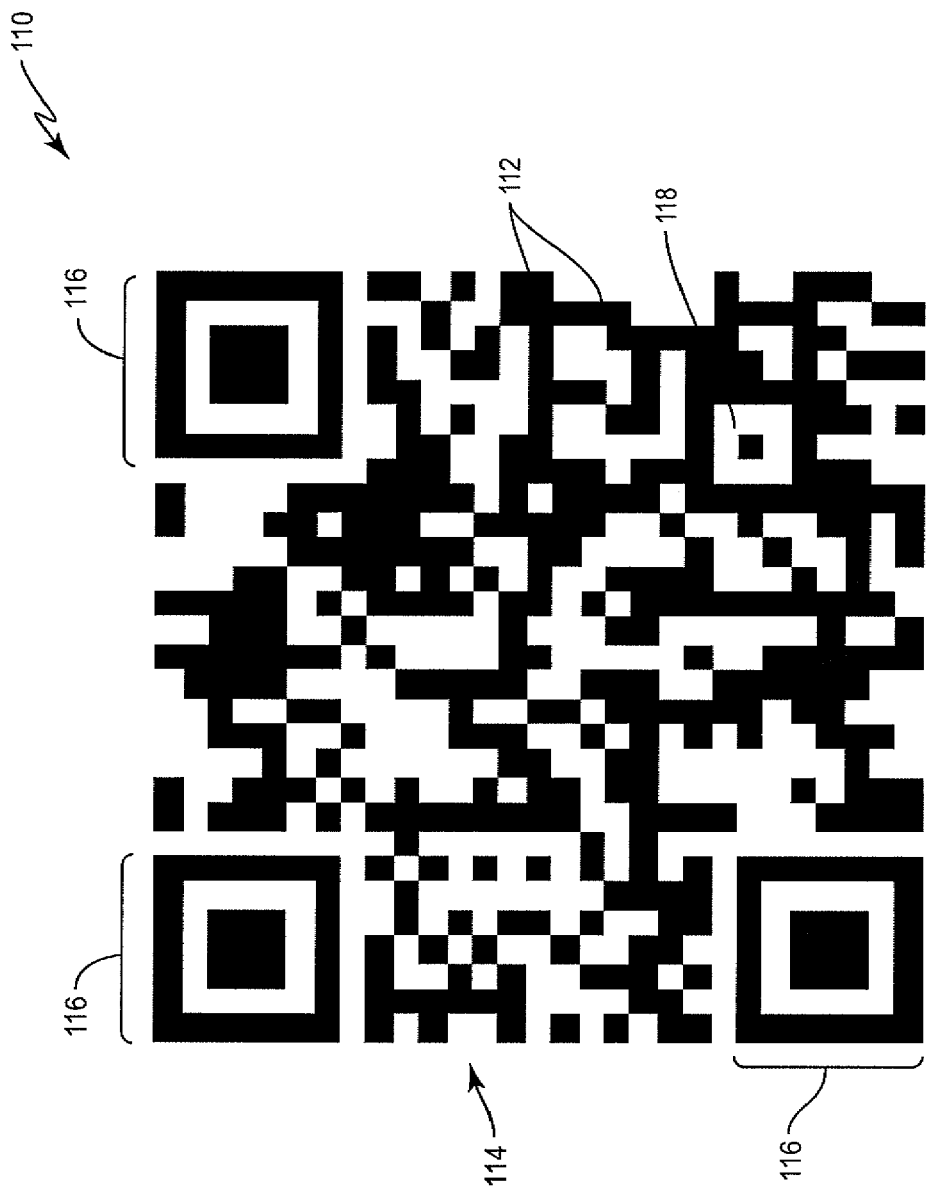
FIG. 5B illustrates a Quick Response (QR) code used in one embodiment of the present invention.

As seen in FIGS. 5A-5B, the QR code 110 is a 2-dimensional matrix bar code comprising consisting of a plurality of black modules 112 arranged in a data area 114 as a square pattern on a white background. QR codes 110 also include a number of alignment, timing, and orientation patterns (e.g., features 116 and 118) to allow the user to scan the QR code 110 at high speed and from almost any angle. The pattern of modules 112 contains the encoded data, which may include, for example, a unique identifier that identifies the device displaying the QR code 110 and/or information that may be used to authenticate the device displaying the QR code 110.

In use, each device 20 may independently generate a unique QR code 110 to include the information needed to identify and authenticate itself to other devices. For example, such information may include the International Mobile Equipment Identity (IMEI) of device 20, the Electronic Serial Number (ESN) of device 20, a username associated with device 20, or some other information that uniquely identifies device 20. As seen in FIG. 5A, the generated QR code 110 may then be incorporated into, and displayed with, the graphical indicator 40, which may be an avatar or an icon, or other display component associated with the application 26. Device 20 would then optically scan (i.e., capture an image of) the graphical indicator 40 containing the QR code 110 with its front-facing camera 28 and process the QR code 110 to extract the encoded information. Using the extracted information, controller 22 would then identify and/or authenticate the other device 20.

Returning to FIG. 4B, if device 20 cannot identify and/or authenticate the other device 20 (box 96), method 80 ends. Otherwise, the two devices 20 would be "paired." For example, as previously stated, the image analysis process permits each device 20 to determine information about the other device 20 that it can use to identify and/or authenticate the other device 20. This information may include, but is not limited to, data such as the telephone number of the device, a unique ID tied to the device (or person that owns the device), a username associated with the device, the ESN of the device, and the like. According to the present invention, one of the devices 20 could generate a message for transmission to the other device 20 (or to the server 50). In one embodiment, the results of the authentication process performed by device 20 could be used initially to determine whether to send a pairing request message to the other device 20 (e.g., messages would only be sent to authenticated devices). If so, the identity information obtained from the analysis could be used as a destination address for the message.

In addition to the image analysis results, the "context" of the application could be used in determining whether to "pair" with the other device. For example, in one embodiment, the "context" if the application comprises information associated with the application (e.g., a title, or a unique ID that identifies the application or an application level, such as a game level). The device 20 that requests the pairing could include information in the message regarding a context of the application that caused the images to be captured. The device 20 that receives the message could then use this context information, in addition to the identifying information, to determine whether to pair with the requesting device 20, or to decide what information to share with the requesting device 20.

In another embodiment, the "context" of the application may be utilized to drive the behavior of device 20. For example, consider one embodiment wherein both devices 20 execute a game application that requires the display screen of each device 20 to remain visible to the other device 20 during game play (i.e., post pairing). In these cases, the controller of one or both devices may periodically (e.g., every 2 seconds) generate the requisite control signals to control the camera to capture an image of the other device 20. Subsequent analysis could ensure that the face F of one device remains facing the other face F. So long as the analysis indicates that both devices continue to face each other, the time interval for capturing images would remain the same (e.g., every 2 seconds). If, however, the application context simply requires data transfer, the controller could be configured to increase the delay time or disable the camera function after the devices 20 are paired.

Normally, once two devices are paired, there would be no need for them to repeat the pairing process. However, the pairing of the two devices 20 may be time-qualified, or circumstances may cause the established link to drop. Thus, there may be cases in which the two devices have to repeat the pairing process. For example, in some embodiments, devices 20 may only be paired for a predetermined time. That time period may be, for example, dictated by some pre-existing policy associated with the game. Once that predetermined time elapses, the communications link between the two devices 20 would be torn down automatically. Alternatively, the link established as a result of the paring may be torn down if a distance between the two devices 20 exceeds a maximum distance, or if one of the users decides to terminate the pairing. Therefore, to once again pair the devices 20, the users would need to repeat the steps of method 80 to identify and/or authenticate themselves to the other. To reduce the time and effort needed to perform the "re-pairing" process, device 20 may store the identification and authentication parameters extracted from the captured image in its memory 24 (box 98). Then, during a "re-pairing" process, device 20 would be able to match the data in the image with that stored in memory 24, and substantially immediately recognize the other device 20 as being a previously identified and authenticated device. This could desirably hasten the pairing process should the devices 20 decide to repeat the pairing process to establish another communication link, as well as reduce the need to obtain network resources.

Once the devices 20 are paired, the present invention permits the devices 20 to perform a number of protected functions. For example, in one or more embodiments, the two devices 20a, 20b can share information (box 100) or exchange content (box 102). The information or content may be, for example, information about the users and/or their devices, such as is exchanged using the BUMP application, or content used by the applications executing on the devices 20. For example, one device could share or exchange weapons, avatars, shields, or other game-related components needed by one or both users to play the game.

In another embodiment, one of the devices (e.g., device 20a) may send an avatar or other component used in the game application to the other device (e.g., device 20b). While the avatar is at device 20b, the user of the device 20a may issue commands to control the avatar on device 20b. By way of example, the avatar could be controlled to navigate a maze associated with the game application, or perform some other game-related function, or cooperate with the other user's avatar to achieve a goal. Once complete, the user would issue a series of commands to retrieve the avatar from device 20b.

In another embodiment, the devices 20, once paired, may be used to control a function on the other device. For example, consider a multi-player game application executing on devices 20 where animals are displayed on the respective displays. The purpose of the game may be to allow avatars used in the game to interact with each other. For example, one device 20a may display a cat, while the other device 20b displays a dog. In addition to information that identifies/authenticates each device to the other, the avatar displayed on the devices 20 could also include encoded information that identifies the characteristics of the particular avatar, as well as the type of interaction performed between the two devices 20.

To facilitate the interaction, the two users would face the front of their respective devices towards each other to allow the front-facing cameras to capture an image of the other's animal avatar. Once the images have been captured and analyzed, the two devices would be paired thereby allowing the interaction. For example, the devices 20 could be controlled such that the corresponding animal sounds for each animal are rendered through the respective speakers whenever the two animals "see" each other (i.e., when the two devices 20 are positioned by their respective users to face each other and both devices 20 can capture an image of the front of the other device 20). Additionally, one avatar (e.g., the cat) could be transferred to the other device and allowed to interact with the other device's avatar (i.e., the dog) or perform some other function.

The present invention may, of course, be carried out in other ways than those specifically set forth herein without departing from essential characteristics of the invention. For example, the previous embodiments described how the devices 20 could exchange data once they identified themselves to each other and were paired. In other embodiments, however, the application (e.g., a game application) executing on each device 20 may require the two devices 20 to exchange content with each other so that one or both devices 20 can send commands, signals, and/or messages to control one or more functions of the other device 20. Such content may be associated with, or be within the context of, the applications that are executing on the respective devices 20.

Additionally, previous embodiments described a predetermined event that was generated by the game application. However, the present invention is not so limited. In one embodiment, the event occurs when the two devices 20 are brought within close proximity to each other. For example, the predetermined event that initiates the image capture functions may occur when each user orients their respective device 20 such that the front F of each device 20 faces the front F of the other device 20. In this case, the short-range transceiver 44 of each device 20 may detect the presence of the short-range transceiver 44 of the other device 20, and in response, initiate the identification and/or authentication process described previously to identify and/or authenticate the other device 20.

Further, the previous embodiments identified the use of a graphical indicator to identify and authenticate a device. As seen in the figures, the graphical indicator may be an icon or avatar. Analyzing the shape of the image, as described previously, is one way to identify the device that displays that image. However, in other embodiments, other characteristics of the image may be used to identify a device. For example, the icon or avatar may be of an animal or object having a unique pattern of stripes, or be of a unique color. Facial recognition techniques may also be used on a given graphical indicator to identify a device, as would certain unique movements of a graphical indicator that is animated.

Additionally, the present invention is not limited solely to the use of an indicator or a QR code. In one embodiment, for example, the device 20 analyzes the graphical indicator locally in an attempt to determine the identity of the device. If this attempt fails, the device 20 automatically contacts the server 50 as previously described to identify the other device 20. Particularly, the device 20 may provide the server 50 with either the graphical indicator, or the QR code, or both the graphical indicator and the QR code for the server 50 to use in identifing and/or authenticating the other device 20. Therefore, the present embodiments are to be considered in all respects as illustrative and not restrictive, and all changes coming within the meaning and equivalency range of the appended claims are intended to be embraced therein.

What is claimed is:

1. A method of pairing a first camera-equipped wireless communications device with a second camera-equipped wireless communications device, each device facing the other and having a front-facing camera lens, the method comprising:
 capturing, at the first wireless communications device, an image of a graphical indicator displayed on a display of the second wireless communications device, wherein capturing the image of the graphical indicator comprises:
  controlling a camera at the first wireless communications device to capture an image of a display screen of the second wireless communications device at predetermined time intervals;
  determining whether the graphical indicator is included in the captured image; and
  increasing the time interval length if the captured image does not contain the graphical indicator;
 analyzing the graphical indicator in the captured image; and
 pairing the first and second wireless communications devices for communications based on the analysis.

2. The method of claim 1 wherein if the graphical indicator is in the captured image, the method further comprises:

comparing information associated with the graphical indicator in the captured image to corresponding information stored in a memory; and identifying and authenticating the second wireless communications device based on the results of the comparison.

3. The method of claim 2 wherein the graphical indicator in the captured image comprises a graphical icon associated with the second wireless communications device.

4. The method of claim 2 wherein the information associated with the graphical indicator comprises data encoded into the graphical indicator.

5. The method of claim 1 further comprising determining a predefined type of interaction to occur between the first and second wireless communications devices based on the analysis.

6. The method of claim 5 wherein the predefined type of interaction comprises sharing data between the first and second wireless communications devices.

7. The method of claim 5 wherein the predefined type of interaction comprises transferring one or more components of a game application from one of the first and second wireless communications devices to the other of the first and second communications devices.

8. The method of claim 5 wherein the predefined type of interaction comprises communicating commands from one of the first and second wireless communications devices to control one or more functions at the other of the first and second communications devices.

9. The method of claim 1 further comprising generating, at the first wireless communications device, a local graphical indicator to appear on a display of the first wireless communications device.

10. The method of claim 9 further comprising generating the local graphical indicator based on data that can be used to identify and authenticate the first wireless communications device to the second wireless communications device.

11. The method of claim 9 wherein pairing the first and second wireless communications devices based on the analysis comprises pairing the first and second wireless communications devices based on the content of an application executing on one or both of the first and second wireless communications devices.

12. A hand-held wireless communications device comprising:
   a camera integrated within a housing of the hand-held wireless communications device;
   a front-facing lens assembly to focus light onto the camera;
   a display; and
   a controller connected to the camera and the display and configured to:
      control the camera to capture an image of a graphical indicator displayed on a display of a remote wireless communications device at predetermined time intervals;
      determine whether the graphical indicator displayed on the display of the remote wireless communications device is included in the captured image;
      increase the time interval length if the captured image does not contain the graphical indicator;
      analyze the captured image of the graphical indicator displayed by the remote wireless communications device; and
      pair the hand-held wireless communications device and the remote wireless communications device for communications based on the analysis.

13. The device of claim 12 wherein if the graphical indicator is included in the captured image, the controller is further configured to:
   compare information associated with the graphical indicator in the captured image to corresponding information stored in a memory; and
   identify and authenticate the remote device based on the results of the comparison.

14. The device of claim 13 wherein the graphical indicator in the captured image comprises an avatar associated with a game application being executed by the remote wireless communications device.

15. The device of claim 13 wherein the information associated with the graphical indicator comprises encoded data.

16. The device of claim 12 wherein the controller is further configured to determine a predefined type of interaction to occur between the hand-held wireless communications device and the remote wireless communications device based on the analysis.

17. The device of claim 16 wherein the predefined type of interaction comprises sharing data between the wireless communications devices.

18. The device of claim 16 wherein the predefined type of interaction comprises transferring one or more components of a game application from one of the wireless communications devices to the other of the wireless communications devices.

19. The device of claim 16 wherein the predefined type of interaction comprises communicating commands from one of the wireless communications devices to control one or more functions at the other of the wireless communications devices.

20. The device of claim 12 wherein the controller is further configured to generate a local graphical indicator to appear on a display of the hand-held wireless communications device.

21. The device of claim 20 wherein the controller is further configured to generate the local graphical indicator based on data that can be used to identify and authenticate the hand-held wireless communications device to the remote wireless communications device.

22. The device of claim 12 wherein the controller is further configured to pair the wireless communications devices based on the content of an application executing on one or both of the wireless communications devices.

* * * * *